C. YEOMAN.
FILTRATION AND/OR PERCOLATION OF LIQUIDS.
APPLICATION FILED OCT. 2, 1916.
1,349,798. Patented Aug. 17, 1920.
3 SHEETS—SHEET 2.
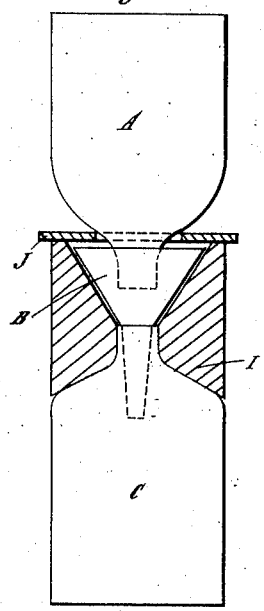
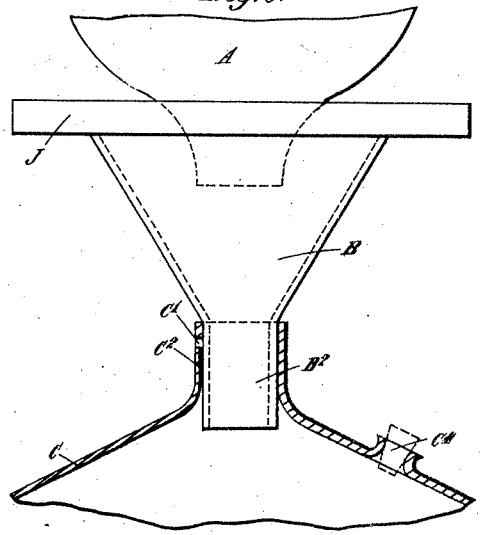
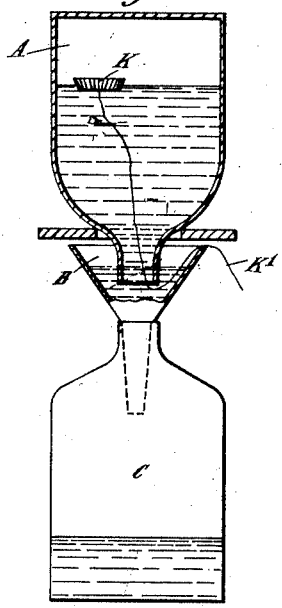
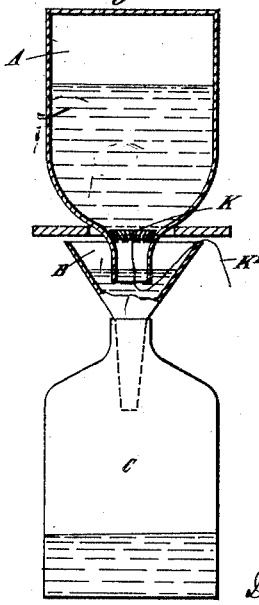

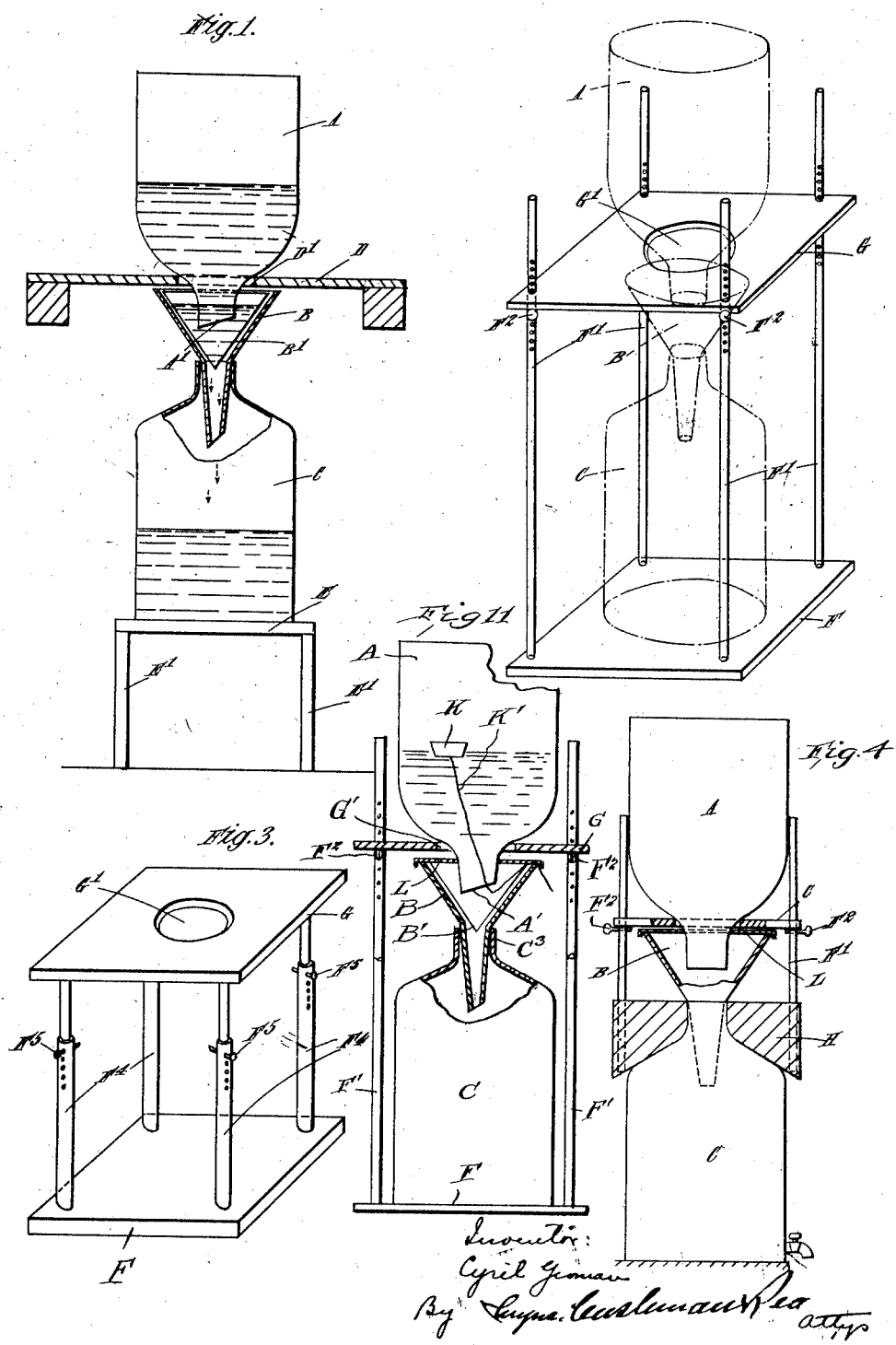

C. YEOMAN.
FILTRATION AND/OR PERCOLATION OF LIQUIDS.
APPLICATION FILED OCT. 2, 1916.
1,349,798.
Patented Aug. 17, 1920.
3 SHEETS—SHEET 3.
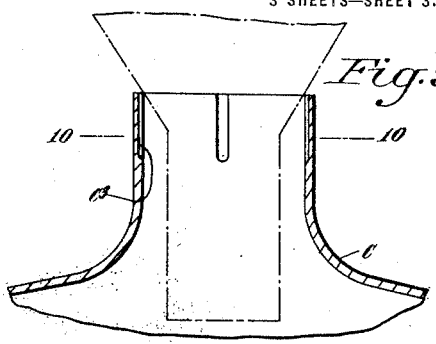
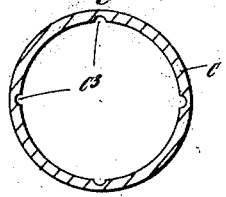
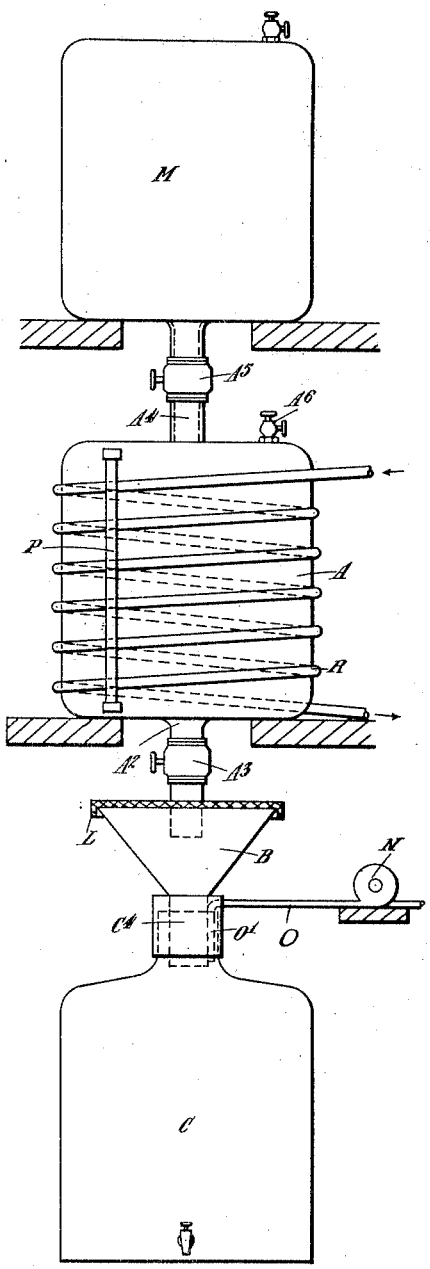

UNITED STATES PATENT OFFICE.

CYRIL YEOMAN, OF HERNE HILL, ENGLAND.

FILTRATION AND/OR PERCOLATION OF LIQUIDS.

1,349,798.

Specification of Letters Patent.

Patented Aug. 17, 1920.

Application filed October 2, 1916. Serial No. 123,268.

*To all whom it may concern:*

Be it known that I, CYRIL YEOMAN, a subject of the King of Great Britain, residing at 137 Half Moon lane, Herne Hill, in the county of Surrey, England, have invented certain new and useful Improvements in or Relating to the Filtration and/or Percolation of Liquids, of which the following is a specification.

This invention relates to the filtration or percolation of liquids. In the filtration of liquids by means of an ordinary funnel containing a filtering paper or other filtering medium and extending into the vessel which receives the filtered liquid, it is necessary to repeatedly fill or charge the funnel until the whole of the liquid has been filtered.

The chief object of the present invention is to enable the unfiltered liquid to be supplied to the funnel automatically so as to avoid pouring liquid into the funnel repeatedly as aforesaid.

According to this invention a vessel (hereinafter termed the container) containing the unfiltered liquid is supported with its neck or outlet projecting into a filtering device (such as a funnel lined or provided with filter paper or other filtering medium) so as to be immersed in the liquid which collects in the filtering device after leaving or flowing from the container.

A vessel or receptacle (hereinafter termed the receiver) is provided below the filtering device to receive the filtered liquid, and is preferably adapted to support the filtering device or funnel.

When the container, filtering device and receiver are arranged in this manner, the liquid in the filtering device or funnel in percolating through the filtering medium into the receiver gradually uncovers the neck of the container at which moment air enters the container and a further quantity of liquid flows from the container into the filtering device, so that the neck is again covered by or immersed in the liquid; thus the filtering device or funnel is automatically and intermittently supplied with unfiltered liquid thereby enabling the filtering operation to be continued automatically until the whole of the unfiltered liquid has been filtered. Suitable means may be provided for supporting the container, filtering device and receiver in the position aforesaid and the said means are preferably made adjustable to enable different sizes of receivers and containers to be employed. In some cases the container, filtering device and receiver may be so designed as to be self supporting; for example the filtering device may rest upon the receiver and the container may rest upon the filtering device. A screen or covering may be provided to prevent the ingress of dust or foreign matter into the filtering device or funnel. A valve or valves may be provided for controlling the filtering operation and the operation of filling the container. The invention may be employed in connection with the filtration of liquids on a small scale as for example in chemical laboratories, etc., or on a large scale as for example in industrial works, etc.

In order that the invention may be clearly understood and readily carried into effect the same will now be described more fully with reference to the accompanying drawings, in which:—

Figures 1 to 5 show diagrammatically several forms of the means for supporting the container, the filtering device and the receiver in position for enabling the automatic filtering operation to be effected.

Fig. 6 illustrates a special type of funnel and receiver.

Figs. 7 and 8 show one type of valve by means of which the filtering operation may be stopped if desired without displacing the container.

Figs. 9 and 10 show details hereinafter referred to.

Fig. 11 is an elevation, and partial section, of an embodiment of several features of the invention.

Fig. 12 illustrates diagrammatically one arrangement for enabling the automatic filtering operation to be carried out on a comparatively large scale.

Throughout the aforesaid figures, A represents the container, B the filtering device or funnel and C indicates the receiver. The container A and the receiver C in most instances may be conical, cylindrical or otherwise suitably shaped while the filtering device may be a usual conical funnel lined with a filter paper B′ as shown particularly in Fig. 1, the container being adapted to be supported in an inverted position above the receiver with its neck or outlet projecting into the filtering device or funnel which latter may rest in the neck or outlet of the receiver.

In commencing the filtering operation the funnel B resting in the receiver C may be first filled with unfiltered liquid and the container A with the unfiltered liquid therein is then inverted and placed above the filtering device so that its neck or outlet is immersed in the liquid in the funnel. As the filtered liquid percolates through the filtering medium B' and flows into the receiver it gradually reaches the level of the orifice in the container neck and consequently uncovers or exposes the same but only momentarily as the air enters the container and at the same time more unfiltered liquid flows from the latter into the funnel so that the level of the liquid rises again and covers the neck of the container. A similar operation again takes place and thus the funnel is automatically and intermittently supplied with liquid from the container so that the filtering operation continues until the whole of the liquid has been filtered. The orifice of the container neck may be made slanting or inclined as shown at A' in Fig. 1 to facilitate the automatic refilling or recharging of the funnel.

As aforesaid the container A, filtering device B and receiver C may be supported in the aforesaid position without the aid of exterior supporting means by the container resting in the inverted position on the filtering device or funnel which latter is supported in the neck of the receiver. It is preferred however in most cases to employ an exterior supporting contrivance which is preferably made adjustable.

In Fig. 1 a fixed board or shelf D having a hole D' therein is adapted to support the container in the inverted or operative position and the receiver C with the funnel B resting in the neck thereof may be supported on a table or bench or as shown it may be supported on a stand E the legs E' of which may be adjustable or extensible. Thus different sizes of containers and receivers can be used and the receiver can be correctly positioned with respect to the container supported on the shelf E by adjusting the legs E' of the stand E. The shelf may if desired be adjustable to different heights and may be provided with several holes D' to support a number of the containers so that several filtering operations can be effected simultaneously.

In Fig. 2 a collapsible and adjustable stand or support is shown and comprises a base F having holes or sockets to receive two or more vertical rods F' on which may be mounted a slidable platform G having a hole G' therein which platform may be set to any fixed position on the rods F' by pins $F^2$ passing through holes in the said rods or by any other suitable means. In this example the receiver with the funnel B supported thereon is placed upon the base F and the container rests in the inverted position on the platform G with its outlet projecting through the hole G' into the funnel as aforesaid. The stand is easily collapsed so as to be packed away in a small space by removing the vertical rods F' from the base F and sliding off the platform G.

Fig. 3 shows a modified form of adjustable stand comprising a base F for the receiver to which base is connected a platform G, by means of telescopic legs $F^4$ which can be set in any fixed position by pins $F^5$, passing through holes in the legs or in any other manner.

Referring to the example shown in Fig. 4 the receiver C is adapted to receive around its upper part or neck collar H which may support or carry vertical rods F' and an adjustable platform G having a hole to receive the container, as shown in Fig. 2; or the construction shown in Fig. 3 may be associated with the supporting collar H. In Fig. 5 a supporting collar I is provided around the neck of the receiver which collar is so shaped as to form a support for the funnel B, and if desired it may also support the container A either directly or by means of a platform J having a hole therein.

In the foregoing examples the funnel B is loosely fitted in the neck of the receiver C which arrangement may not be desirable in all cases especially when the container A is to be supported by resting upon the funnel. Therefore as shown in Fig. 6 the stem $B^2$ of the funnel B may be shaped and ground to fit tightly into the neck of the receiver similarly to an ordinary stopper. A hole C' is provided in the neck of the receiver C and a groove or channel $C^2$ may also be formed on the interior of the bottle neck to allow the egress of air from the receiver during the ingress of the filtered liquid to the receiver. With this construction the container A may be safely supported on the funnel either directly or by means of a perforated platform such as J. In addition to or instead of the hole C' in the receiver neck an aperture may be provided in the upper part of the receiver as shown at $C^4$, in Fig. 6, which aperture may be closed when desired by a cork or the like.

In some cases it may be desired to provide a valve or obturator to stop or restrain the flow of liquid from the container. A simple form of such a valve is shown in Figs. 7 and 8 and comprises a floating disk or other member K inside the container and provided with a string or cord K' which passes through the orifice of the container so that the valve can be pulled downwardly to seat against the shoulder of the container to close or obstruct the orifice see Fig. 8. By releasing the string or cord K' the float valve K will automatically rise to the level of the liquid in the container thereby enabling the filtering operation to be recommenced. This type of valve is also useful in starting the operation as the container can be closed for enabling it to be placed in the inverted or operative position and afterward the valve can be released so that the liquid will flow into the funnel until it covers the neck of the container when as previously stated the filtering operation continues automatically.

In most examples in which the funnel is placed loosely in the receiver so as to bear or rest upon the neck thereof it is desirable to provide for a free escape of air from the receiver as the filtered liquid enters. For this purpose either the funnel or the receiver neck (or both) at the parts where they are in contact may be grooved or otherwise formed to provide air passages. In Figs. 9 and 10 the interior of the upper part of the neck of the receiver C is provided with a series of grooves or channels $C^3$ which allow free passage of air from the receiver.

In all the aforesaid examples a dust and germ proof screen may cover the funnel B as shown by L in Fig. 4. In Fig. 11 there is illustrated a complete apparatus in which the several parts are supported by means such as shown in Fig. 2, the container being provided with a valve of the character shown in Figs. 7 and 8 and the mouth or neck of the receiver as illustrated in Figs. 9 and 10. The foregoing examples are especially suitable for filtering liquids on a comparatively small scale, but in Fig. 12 a diagrammatic arrangement is shown for enabling the automatic filtering operation to be carried out on a much larger scale. In this case the container A and the receiver C are in the form of tanks the filtering device being of conical, cylindrical or of other formation and preferably secured to the receiver in an air tight manner by means of a suitable connection as indicated at $C^4$.

The container A has an outlet pipe $A^2$ with a suitable control valve $A^3$ which pipe projects into the filtering device through a dust or germ proof screen or cover L on the filtering device. In the example shown the container A is connected to a supply tank M by a pipe $A^4$ controlled by an inlet valve $A^5$ so that the container can be readily supplied with the unfiltered liquid. In order to charge the container with the liquid the valve $A^3$ on the outlet pipe $A^2$ is closed and an air valve or vent $A^6$ on the upper part of the container is opened. The valve $A^5$ on the pipe $A^4$ is then opened and liquid, flows from the supply tank to the container; when the latter is filled the air valve $A^6$ and the inlet $A^5$ are closed and by opening the outlet valve $A^3$ the filtering operation is commenced.

The valve $A^3$ may be so formed that when opened it does not reduce the size or bore of the passage in the outlet pipe $A^2$. The tank M may be similar in general shape and in size to the container A and it may be supplied with liquid in any appropriate manner.

When the air tight connection between the filtering device and the receiver is provided, it is necessary to provide means for exhausting the air from the receiver and this may be effected by a pump or exhauster N which draws the air from the receiver through the pipe O. The suction effect produced is advantageous as it accelerates the filtering operation and a pump or other exhausting means may be provided for this purpose in any of the modifications shown in Figs. 1 to 11. A gage P may be provided on the container to show the level of the liquid therein at any time during the filling or filtering operations. In some cases when filtering viscous liquids it may be necessary, in order to facilitate the filtering operation, to apply heat to the container to reduce the viscosity and this may be effected by providing a spiral pipe R around the container A through which pipe may be passed steam or other heating medium.

In the case of percolation as distinct from filtration the vessel containing the marc saturated with a solvent is inverted so that its neck or outlet can be submerged in a funnel or similar device. Percolation therefore takes place through the marc and owing to the submerged outlet of the container the operation is automatic as previously described in connection with the filtration process. During the percolation active principles in the marc are extracted; generally it will be necessary to filter the percolated liquid or fluid after the percolation or extraction process has been effected, but in some cases it may be desirable to effect percolation and filtration simultaneously for example by providing a filter paper or the like in the funnel. The term filtering device is therefore intended to cover any percolating medium.

What I claim and desire to secure by Letters Patent of the United States is:—

1. In an apparatus for the purpose described, the combination of a filter, a receptacle for filtered liquid, a container for liquid to be filtered having a neck portion extending into the filter, whereby its outlet will be immersed in the liquid therein, a valve for controlling flow of liquid to the filter adapted to normally float in the liquid in said container, and means for moving the valve to close the outlet from the container.

2. In combination, a filtering device comprising a funnel provided with a filtering medium, a vessel for receiving the filtered fluid from said funnel, a container for the unfiltered fluid, provided with a neck at one end, said container being inverted and supported with its neck portion projecting directly into said funnel, a valve within said container, and a string connected to said valve and threaded through the neck portion of the container and over the edge of said funnel to permit said valve to be drawn into operative position to close off the flow of unfiltered fluid from said container.

CYRIL YEOMAN.